United States Patent
Krebs (10) Patent No.: US 12,250,726 B2
(45) Date of Patent: Mar. 11, 2025

(54) METHOD, COMPUTER PROGRAM AND WIRELESS COMMUNICATION DEVICE FOR COMMUNICATION USING A PSEUDO-RANDOM VALUE

(71) Applicant: Bayerische Motoren Werke Aktiengesellschaft, Munich (DE)

(72) Inventor: Alexander Krebs, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 435 days.

(21) Appl. No.: 17/765,914

(22) PCT Filed: Mar. 27, 2020

(86) PCT No.: PCT/EP2020/058806
§ 371 (c)(1),
(2) Date: Apr. 1, 2022

(87) PCT Pub. No.: WO2021/063545
PCT Pub. Date: Apr. 8, 2021

(65) Prior Publication Data
US 2022/0377803 A1      Nov. 24, 2022

(30) Foreign Application Priority Data
Oct. 2, 2019   (EP) .................................. 19201153

(51) Int. Cl.
*H04W 72/04*      (2023.01)
*H04W 74/0833*    (2024.01)

(52) U.S. Cl.
CPC .............................. *H04W 74/0833* (2013.01)

(58) Field of Classification Search
CPC ............... H04W 74/0833; H04B 1/715; H04B 2001/7154; H04B 1/719; H04B 7/0676; H04J 11/0023; Y02D 30/70
See application file for complete search history.

(56) References Cited

U.S. PATENT DOCUMENTS

| 2003/0072442 A1* | 4/2003 | Blakley ................... G06F 7/723 380/28 |
| 2009/0072944 A1 | 3/2009 | Hayward |

(Continued)

FOREIGN PATENT DOCUMENTS

| CN | 101645772 A | * | 2/2010 | |
| CN | 105376055 A | * | 3/2016 | ........... H04L 9/0625 |

OTHER PUBLICATIONS

International Search Report (PCT/ISA/210) issued in PCT Application No. PCT/EP2020/058806 dated Jun. 5, 2020 (three (3) pages).

(Continued)

*Primary Examiner* — Mahbubul Bar Chowdhury
(74) *Attorney, Agent, or Firm* — Crowell & Moring LLP (57) ABSTRACT

Methods, systems, and devices are provided for wireless communication. A wireless communication device includes a transceiver to communicate with another wireless communication device. The wireless communication device further includes a processor to determine a pseudo-random value using a non-recursive function having at least one non-linear component. The processor further selects a wireless resource based on the pseudo-random value and uses the wireless resource for a wireless communication with the other wireless communication device.

13 Claims, 2 Drawing Sheets

(56) References Cited

U.S. PATENT DOCUMENTS

| | | |
|---|---|---|
| 2015/0334760 A1 | 11/2015 | Sartori et al. |
| 2018/0337956 A1* | 11/2018 | Sigel ................... H04W 12/08 |
| 2018/0343119 A1 | 11/2018 | Chen |
| 2020/0226789 A1* | 7/2020 | Ma ........................... G06T 7/70 |
| 2021/0226783 A1* | 7/2021 | Levin ................... H04L 9/3033 |
| 2021/0341436 A1* | 11/2021 | Perdios ............... G01S 7/52077 |
| 2022/0021521 A1* | 1/2022 | Shamai ................ H04L 9/0869 |

OTHER PUBLICATIONS

Written Opinion (PCT/ISA/237) issued in PCT Application No. PCT/EP2020/058806 dated Jun. 5, 2020 (seven (7) pages).
Extended European Search Report issued in European Application No. 19201153.4 dated Mar. 26, 2020 (nine (9) pages).
Ayanzadeh R. et al.: "Multi-Layer Cellular Automata for Generating Normal Random Numbers", Electrical Engineering (ICEE), 2010 18th Iranian Conference on, IEEE, May 11, 2010, pp. 495-500, Piscataway, NJ, USA, XP031706810 (six (6) pages).
Wang M. et al.: "Combined Random Number Generators: A Review", Communication Software and Networks (ICCSN), 2011 IEEE 3rd International Conference on, IEEE, May 27, 2011, pp. 443-447, XP032050638 (five (5) pages).
European Office Action issued in European Application No. 19201153.4 dated Sep. 6, 2022 (five (5) pages).

* cited by examiner

Fig. 2

METHOD, COMPUTER PROGRAM AND WIRELESS COMMUNICATION DEVICE FOR COMMUNICATION USING A PSEUDO-RANDOM VALUE

BACKGROUND AND SUMMARY OF THE INVENTION

Wireless communication systems are a field of research and development. In various wireless communication systems, a shared communication channel is used by a multitude of different wireless communication devices. In some cases, there is no scheduling on the communication channel by a base station, but the wireless communication device may use the wireless communication device in a programmatically determined manner. Pseudo-random-based access methods are often used to avoid continuous interference of radio transmissions from several wireless communication devices on such a shared wireless channel. For example, random channel selection (or random time slot selection) may be used to avoid situations, in which collisions (i.e. destructive superposition) between wireless transmissions of two wireless communication devices not communicating with each other occur infinitely often. Well-known pseudo-random based channel access methods are, for example, the "ALOHA" approach. Another well-known method is the "Adaptive Frequency Hopping" approach used in the Bluetooth standard.

In the practical implementation of genuinely random-based access procedures, the receiver may expect and read out all channel accesses that can be used by the sender, which consumes a high amount of energy. If this is not guaranteed, packet loss may occur, even if no collision occurs.

For the practical implementation of pseudo-random-based access procedures, the recipient can follow the genuinely random-based access procedures. An alternative approach can be achieved by disclosing the calculation rule and the dependent parameters of the pseudo-random number generator used by the sender. In this case, the channel access of the transmitter can be calculated, so the receiver might only listen at the frequency or time resource specified by the calculation rule. With the "ALOHA" approach, the receiver can achieve advantages in energy consumption. With Bluetooth "Adaptive Frequency Hopping", the receiver structure may be simplified considerably.

Random number generators that are practically easy to implement, such as the class of "linear congruence generators", often exhibit statistically undesirable properties for the application purpose described above. Higher quality random number generators (e.g. Mersenne twisters) often require higher implementation effort and higher memory requirements, and may require a vastly higher effort if synchronization between two wireless communication devices is lost.

There may be a desire for an improved concept for determining a pseudo-random value for a channel access that overcomes the above shortcomings.

At least some embodiments of the present disclosure are based on the finding that a particularly disadvantageous property for the determination of a pseudo-random value for a channel access is the recursive nature of the calculation rule used by the Mersenne Twister. This may become relevant if the synchronization between sender and receiver is temporarily lost. If the synchronization is lost, the receiver may revert to the method of scanning all channel accesses possible by the sender (as with genuinely random-based access methods, with the higher effort described above).

After the receiver receives a packet from the sender, one of the following options may be performed:

After successfully resuming communication with the transmitter, the receiver may execute the recursion rule for each individual channel access in the past to restore the synchronization state of the pseudorandom generators between the transmitter and receiver. This may result in considerable calculation effort on the part of the recipient.

Alternatively, in each channel access, the transmitter may completely transmit the internal state information of the pseudorandom number generator that led to the respective channel access. On reception of the state information, the receiver may replace the local state information of the pseudo-random generator with the state information provided by the transmitter. The resulting disadvantage is the increased communication effort. For the aforementioned pseudorandom generator "Mersenne Twister", an internal state information of approx. 2500 byte may be required for the resynchronization of a 32-bit wide pseudorandom number. In many cases, the transmission of such long state information is contrary to the purpose of the application and might not be possible in individual cases. For example, the aforementioned Bluetooth standard limits the transmission to a maximum of 265 bytes per channel access, and therefore the use of this method may not be suitable.

Therefore, embodiments may provide an improved concept for determining a pseudo-random value that is suitable for channel access.

Embodiments of the present disclosure provide a method for a wireless communication device. The method comprises determining a pseudo-random value. The pseudo-random value is determined using a non-recursive function having at least one non-linear component. The method comprises selecting a wireless resource based on the pseudo-random value. The method comprises using the wireless resource for a wireless communication with a further wireless communication device. By determining the pseudo-random value using a function having at least one non-linear component, the statistically undesirable properties of the congruence generator may be avoided. By using a non-recursive function, the effort for recovery of a lost synchronization may be reduced.

For example, the pseudo-random value may be determined using a seed value and an index value. The seed value may be known between the wireless communication device and the further wireless communication device. The index value may be changed for every wireless transmission between the wireless communication device and the further wireless communication device. For example, the seed value may be exchanged between the two wireless communication devices and may be valid for an entire communication session. The index value may be a value to be changed for every transmission. The two wireless communication devices may use a calculation rule to determine the index value, e.g. based on a numbering of packets being transmitted between the two wireless communication devices. For example, if a synchronization is lost between the two wireless communication devices, a plurality of different feasible index values may be used to determine a plurality of wireless resources that may be used for a wireless transmission of the respective other wireless communication device, in order to synchronize the state of the pseudo-random number/value generator.

In some embodiments, a formula being used to determine the pseudo-random value is, apart from the seed value and the index value, based on constant values. In this case, a synchronization of the index value at both wireless communication devices may suffice.

For example, the method may comprise receiving information on the seed value and/or information on the index value from the further wireless communication device. Alternatively or additionally, the method may comprise transmitting the information on the seed value and/or the information on the index value to the further wireless communication device. Once the index value is synchronized between the two wireless communication devices, both wireless communication devices may determine the wireless resources being used by the respective other wireless communication device.

In some embodiments, the pseudo-random value is determined based on a non-linear transformation of a combination of the seed value and the index value. For example, the non-linear transformation comprises an exponentiation (e.g. of the combination of the seed value and the index value). The resulting pseudo-random values may avoid the statistically undesired properties of the basic congruence generators.

An upper limit of the combination of the seed value and the index value may be based on a bit-width of an architecture of the wireless communication device. For example, the upper limit of the combination of the seed value and the index value may be limited by a modulo operation. The resulting range may be a range that is supported by the architecture of the wireless communication device. For example, if the wireless communication device has a 32 bit architecture, the combination of the seed value and the index value may be limited to a 32 bit integer, e.g. by performing a modulo operation "mod $2^{32}$". If the combination of the seed value and the index value is now potentiated, e.g. ((seed+index)mod $2^{32})^2$, the result fits into a 64 bit integer (twice the bit-width of the architecture), which often is the largest integer value being supported by the architecture.

For example, the pseudo-random value may be calculated using one of $$(\text{index}+\text{seed})^k \bmod n$$

or $$((\text{index}+\text{seed}) \bmod m)^k \bmod n$$

wherein index is the index value, seed is the seed value, and k, m and n are natural numbers. These formulae represent non-recursive functions having at least one non-linear component. For example, the above formulae may be congruence generators having at least one non-linear component (i.e. the potentiation).

In some embodiments, $m=2^{width\_bits}$ and n is a prime number that is lower than m. width_bits may be the bit-width of an architecture of the wireless communication device. This may provide an upper limit of the combination of the seed value and of the index value that is aligned with the architecture of the wireless communication device.

In the following, the above formula is provided for 16-bit architectures and 32-bit architectures. For example, the pseudo-random value may be calculated using $$((\text{index}+\text{seed}) \bmod 65536)^2 \bmod 65521$$

or $$((\text{index}+\text{seed}) \bmod 4294967296)^2 \bmod 4294967291.$$

16-bit or 32-bit architectures are common among wireless communication devices.

In some embodiments, the pseudo-random value is limited to a range of values using a modulo operation. The modulo-operation may be performed using a prime number. The prime number may be based on a bit-width of an architecture of the wireless communication device. Modulo operations may be used to provide an upper limit for a range of the pseudo-random value. A prime-number based modulo operations may result in a long periodicity of the resulting pseudo-random values. By using a prime-number that is based on the bit-width of the architecture of the wireless communication device, the upper limit of the range may be aligned with the architecture of the wireless communication device.

In general, the selected wireless resource may be used by one of the wireless communication devices to transmit a wireless transmission, and by the other to receive the wireless transmission. Accordingly, the selected wireless resource may be used for listening for a wireless transmission of the further wireless communication device. Alternatively, the selected wireless resource may be used for transmitting a wireless transmission to the further wireless communication device.

For example, the wireless resource may be one or more of a frequency resource, a time resource or a frequency-time resource. Listening for wireless resources on multiple frequency bands and/or in multiple time slots may increase an energy consumption at a receiving wireless communication device, which may be avoided if both wireless communication device use the (same) pseudo-random value to select the wireless resource.

Embodiments of the present disclosure further provide a computer program having a program code instructions for performing the method, when the computer program is executed on a computer, a processor, or a programmable hardware component.

Embodiments of the present disclosure further provide a wireless communication device comprising a transceiver module for communicating with a further wireless communication device, and a processing module. The processing module is configured to determine a pseudo-random value. The pseudo-random value is determined using a non-recursive function having at least one non-linear component. The processing module is configured to select a wireless resource based on the pseudo-random value. The processing module is configured to use the wireless resource for a wireless communication with the further wireless communication device.

Embodiments of the present disclosure further provide a system comprising a wireless communication device and a further wireless communication device. The processing module of the wireless communication device is configured to use the selected wireless resource for listening for a wireless transmission of the further wireless communication device. The processing module of the further wireless communication device is configured to use the selected wireless resource for transmitting a wireless transmission to the wireless communication device.

DETAILED DESCRIPTION OF THE DRAWINGS

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

Unless otherwise defined, all terms (including technical and scientific terms) are used herein in their ordinary meaning of the art to which the examples belong.

Figure 1A:
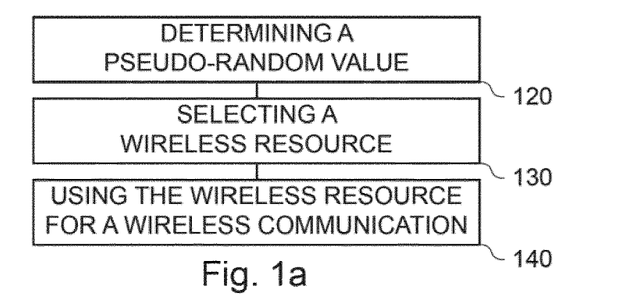
FIGS. 1a and 1b show flow charts of embodiments of a method for a wireless communication device in accordance with the present subject matter.
Figure 1B:
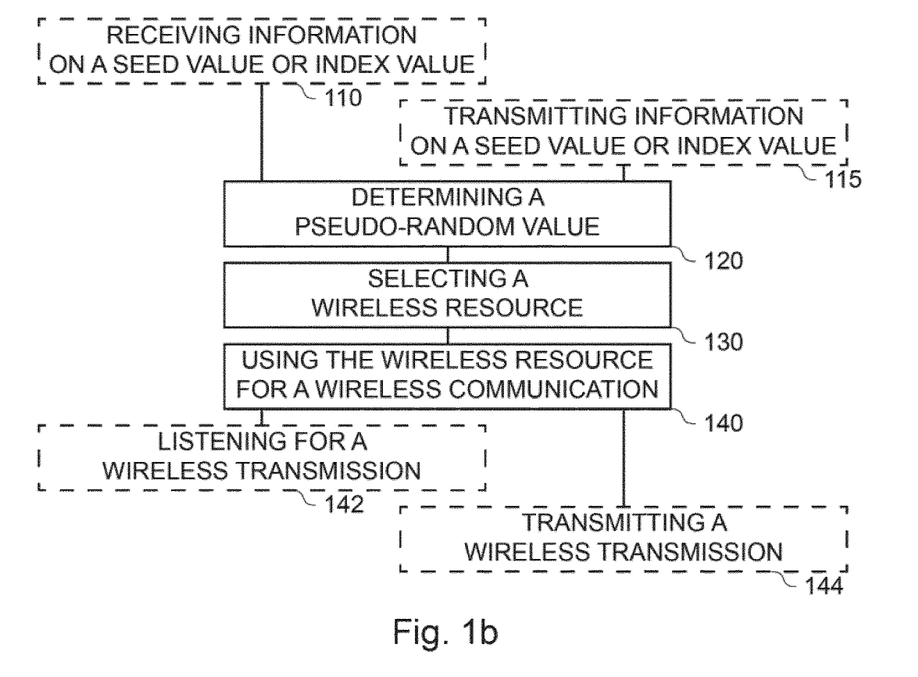

FIGS. 1a and 1b show flow charts of embodiments of a method for a wireless communication device. The method comprises determining 120 a pseudo-random value. The pseudo-random value is determined using a non-recursive function having at least one non-linear component. The method comprises selecting 130 a wireless resource based on the pseudo-random value. The method comprises using 140 the wireless resource for a wireless communication with a further wireless communication device. For example, the method may be executed by the wireless communication device.

Figure 1C:
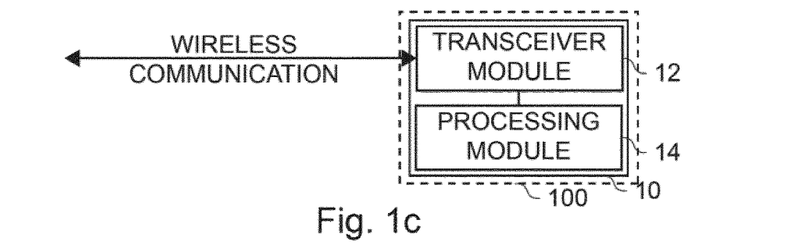
FIG. 1c shows a block diagram of an example of a wireless communication device in accordance with the present subject matter.

FIG. 1c shows a block diagram of an example of a corresponding wireless communication device 10. The wireless communication device comprises a transceiver module 12 for communicating with a further wireless communication device. The wireless communication device comprises a processing module 14 that is coupled with the transceiver module 12. In general, the processing module 14 may be configured to execute the method of FIG. 1a and/or 1b. For example, the processing module 14 is configured to determine the pseudo-random value. The pseudo-random value is determined using the non-recursive function having at least one non-linear component. The processing module 14 is configured to select a wireless resource based on the pseudo-random value. The processing module 14 is configured to use the wireless resource for a wireless communication with the further wireless communication device. FIG. 1c further shows a device, e.g. such as a vehicle or a mobile device, comprising the wireless communication device 10.

The following description relates to both the method of FIGS. 1a and/or 1b and to the wireless communication device of FIG. 1c.

Embodiments of the present disclosure relate to a method and a computer program for a wireless communication device, and to a corresponding wireless communication device. The wireless communication device may be a wireless communication device that performs (or is configured to perform) wireless communication with the further wireless communication device. For the wireless communication, the two wireless communication devices use a channel that is shared by at least two wireless communication devices, e.g. the wireless communication device, the further wireless communication device and/or other wireless communication devices. In other words, the wireless communication device and the further wireless communication device may communicate via a shared wireless channel. In embodiments, this shared channel might not be controlled by a base station, i.e. the wireless resources might not be scheduled by the base station. Instead, the wireless communication devices may decide for themselves which wireless resources on the shared wireless channel they use. This may lead to collisions on the shared wireless channels—if two wireless transmissions are performed on the shared wireless channel at the same time and in the same frequency band, these two wireless transmissions may be (destructively) superimposed, rendering decoding any of the two wireless transmissions difficult or impossible. In the context of the present disclosure, the wireless resource (that is selected based on the pseudo-random value) may be one or more of a frequency resource, a time resource or a frequency-time resource.

Once two wireless communication devices have detected that a wireless transmission has led to a collision, the two wireless communication devices may attempt to re-transmit the wireless transmission. In order to avoid further collisions, wireless communication devices usually rely on a pseudo-random value, e.g. the pseudo-random value, to select another wireless resource at random, with the assumption that the other wireless communication device that has transmitted the other colliding packet, will use a different pseudo-random value, which may lead to the selection of a different wireless resource. This approach is present in a number of different approaches, such as the previously introduced "ALOHA" approach or adaptive frequency hopping of Bluetooth.

Embodiments of the present disclosure relate to the generation of the pseudo-random value that is used, by the wireless communication devices, to select sufficiently random wireless resources to communicate. In general, the selected wireless resource may be used by a transmitting wireless communication device to transmit a wireless transmission. In addition, the selected wireless resource may also be used at the receiving wireless communication device, e.g. in order to predict the time resource, frequency resource or frequency-time resource of the transmission of the transmitting wireless communication device. Such information may be valuable in the implementation of energy-saving capabilities of the receiving wireless communication device, as the wireless communication device might only have to listen for the wireless transmission at the "right" time resource, frequency resource or frequency-time resource, instead of having to listen all the time, or at multiple frequency resources.

In general, this may be accomplished by sharing the details of the function that is used for the calculation of the pseudo-random value between the two wireless communication devices that communicate with each other. In congruence generators, this usually requires knowledge about the previous pseudo-random value, information about an increment, information about a factor and information about a modulo operand that is being used to limit the pseudo-random value. Such information, which may be denoted the "state" of the pseudo-random number generator, usually requires few bytes in the case of the congruence generators and can be easily shared between the wireless communication devices. Unfortunately, congruence generators may exhibit undesired statistical properties, which may lead to a higher number of collisions between the same two wireless communication devices. Other, more complex pseudo-random generators, such as the Mersenne Twister may require vastly larger "states", which might not be easily shared between wireless communication devices. These states can be reconstructed, if the parameters are known, alleviating the need to transmit the state between the wireless communication devices, but the calculation usually relies on recursion, so that the reconstruction of the state requires a (comparatively) large amount of computing resources.

These properties of the respective approaches come into play when a synchronization between two wireless communication devices is lost, for example, when a number of transmissions from a further wireless communication device cannot be successfully received by a wireless communication device and the wireless communication device thus does not know which wireless resources is to be used for the next wireless transmission. In this case, the wireless communication device may revert to a mode in which all (suitable) frequency resources are scanned all the time for transmissions of the further wireless communication device all of the time. Once it has received another transmission of the further wireless communication device, the state of the pseudo-random value generator may be reconstructed, if either the wireless transmission includes sufficient information to reconstruct the state (preferably without having to perform recursive calculations, which might overwhelm the wireless communication device), or if the function being used to calculate the pseudo-random value is simple enough so the wireless communication device can calculate a number of potential states, and corresponding wireless resources, and settle for the state that explains the resource being used by the further wireless communication device. Embodiments of the present disclosure thus aim to provide a concept for the selection of wireless resources based on a pseudo-random value, that enables or facilitate a re-synchronization of the state of the pseudo-random number generator between two wireless communication devices in case of a loss of synchronicity. Embodiments may provide a deterministic pseudo-random number generator with an explicit, non-recursive calculation rule (i.e. function) for selecting channel access (i.e. the wireless resource) in a multichannel wireless communication system.

In general, the wireless communication device, and/or the further wireless communication device, may be wireless communication devices that are used by other devices, e.g. communication chipsets that are used by a mobile device, vehicle key fob or a vehicle to communicate via a wireless communication protocol, such as an Ultra-Wide-Band (UWB) communication protocol, e.g. such as IEEE 802.15.4z (a communication protocol specified by the Institute of Electrical and Electronics Engineers). Accordingly, the first wireless communication device and the second wireless communication device may communicate using Ultra Wide-Band communication. For example, the first and second wireless communication devices may be UWB chipsets, e.g. part of a wireless communication chipset, such as a combined WiFi/UWB chipset. In general, the wireless communication device may be used by any device, such as mobile devices, stationary devices, beacons, telecommunication equipment etc. More specifically, embodiments may be used in the automotive field, e.g. for the communication between a vehicle key and a vehicle. Accordingly, one of the wireless communication device and the further wireless communication device may be a wireless communication device of a vehicle key. The other of the wireless communication device and the further wireless communication device may be a wireless communication device of a vehicle. Embodiments further provide a vehicle comprising the wireless communication device. Embodiments further provide a vehicle key comprising the wireless communication device. In some embodiments, the vehicle key may be a (single-purpose) hand transmitter. Alternatively, the vehicle key may be implemented by a mobile device, such as a smartphone or a wearable device.

The method comprises determining (i.e. calculating or computing) 120 a pseudo-random value. In general, the pseudo-random value may be a pseudo-random number. Accordingly, the method, computer program and wireless communication device may implement a pseudo-random value/number generator. In general, a pseudo-random value is a value that "appears" random, but is calculated using a function. In the context of the present disclosure, the pseudo-random value may be a natural number, e.g. an integer that is larger or equal zero. Alternatively, the pseudo-random value may be an (arbitrary) bit vector. In general, the pseudo-random value may be limited by a number of bits being used to represent the pseudo-random value. For example, if the pseudo-random value is represented by (at most) width_bits bits, at most $2^{width\_bits}$ different pseudo-random values may be supported (in a binary system), so an (unsigned) integer value of the pseudo-random value may be at most $2^{width\_bits}-1$.

In embodiments, the pseudo-random value is determined using a non-recursive function having at least one non-linear component. For example, a nonlinear element may be inserted into the structure of a linear congruence generator of a pseudorandom number generator. In general, a function may be considered non-recursive, if the calculation of the nth (pseudo-random) value does not require the calculation of the (n−1)th (pseudo-random) value, i.e. if, in order to calculate the nth (pseudo-random) value, not (all of) the pseudo-random values 1 . . . (n−1) have to be calculated. For example, the function may be deemed non-recursive, if a formula being used to determine the pseudo-random value is, apart from a seed value and an index value, based on constant values. For example, the pseudo-random value may be determined 120 using a seed value and an index value.

In computing, a seed (i.e. a random seed) value is a number that is used to initialize a pseudo-random number generator. The seed determines the operation of the pseudo-random number generator—if the pseudo-random number generator is initialized twice with the same seed, it will produce the same sequence of numbers (e.g. so the receiving wireless communication device can determine the pseudo-random values generated by the transmitting wireless communication device). The seed value may be known between the wireless communication device and the further wireless communication device. For example, the seed value may be a natural number that may be used an initialization value of the pseudo-random value generator. The seed value may be statically defined between transmitter and receiver, e.g. between the two wireless communication devices. For example, the seed value may be exchanged (or independently determined) between the wireless communication device and the further wireless communication device, e.g. when a communication session is established between the wireless communication device and the further wireless communication device. Accordingly, the method may comprise receiving 110 information on the seed value from the further wireless communication device. Alternatively, the method may comprise transmitting 115 information on the seed value to the further wireless communication device. In some embodiments, the method may comprise generating the seed value, e.g. based on a further pseudo-random number generator or derived from a cryptographic secret shared between the wireless communication device and the further wireless communication device.

While the seed value may remain static between wireless transmissions, the index value may be changed for every wireless transmission between the wireless communication device and the further wireless communication device. For example, the index value may be a counter describing the dynamic state of the pseudo-random value generator. For example, the index value may be the component of the function that is changed in order to yield different pseudo-random values. In some embodiments, the index value is simply incremented (by 1). In this case, the index value represents the current position within the sequence of pseudo-random values being generated by the function. In embodiments, the index value may be tied to a number of wireless transmission (i.e. of transmitted packets) between the wireless communication device and the further wireless communication device. For example, for the n-th wireless transmission of the further wireless communication device to the wireless communication device, the index value n may be used. Therefore, in case the wireless communication device has lost synchronization, the numbering of the wireless transmissions (e.g. the packet number) may be used to recover the index value. In more general terms, the method may comprise receiving 110 information on the index value (e.g. as wireless transmission number/packet number) from the further wireless communication device, or transmitting 115 information on the index value (e.g. as wireless transmission number/packet number) to the further wireless communication device. In the following, the index value may be assumed to be a natural number (index$\in \mathbb{N}$).

In at least some embodiments, the pseudo-random value is determined 120 based on a non-linear transformation of a combination of the seed value and the index value. For example, the combination of the seed value and the index value may comprise a sum of the seed value to the index value. Other mathematical operations are also feasible. This combination may be limited in size, e.g. in order to avoid an overflow of a variable type (e.g. unsigned integer) used to represent the combination of the seed value and the index value. In other words, an upper limit of the combination of the seed value and the index value may be based on a bit-width of an architecture of the wireless communication device. For this, the seed value and the index value may either be chosen sufficiently small, or another operation may be employed to avoid the combination exceeding an upper limit. For example, a modulo operation may be performed on the combination of the seed value and the index value. For example, the combination of the seed value and the index value may be defined as (seed+index) mod m, wherein seed is the seed value, index is the index value, $m=2^{width\_bits}$, wherein width_bits is a bit-width of an architecture of the wireless communication device (which may be known between the wireless communication device and the further wireless communication device), and the operation mod m is used to limit the combination to at most $2^{width\_bits}-1$. Furthermore, a non-linear transformation may be performed on the combination of the seed value and the index value. For example, the non-linear transformation may comprise exponentiation (e.g. of the combination of the index value and the seed value). For example, the combination of the index value and the seed value may be raised to the power of k, with k being a positive integer, e.g. a positive integer greater than 1, e.g. 2, 3, 4, 5, 8, 10 etc. The potentiation of the combination of the index value and the seed value may yield the non-linear component of the function.

Consequently, the pseudo-random value may be determined 120 using one of $$(\text{index}+\text{seed})^k \bmod n$$

or $$((\text{index}+\text{seed}) \bmod m)^k \bmod n$$

wherein index is the index value, seed is the seed value, and k, m and n are natural numbers. Again, a formula being used to determine the pseudo-random value may be, apart from the seed value and the index value, based on constant values. In this case, m, k and n may be constant, natural numbers.

For example, the operand n may be used to limit the pseudo-random value to a range of values. In other words, the pseudo-random value may be limited to a range of values using a modulo operation (with the operand n). In general, to obtain a high periodicity of the pseudo-random value/number generator, n may be a prime number. In other words, the modulo-operation may be performed using a prime number. Furthermore, in order to cover the entire range permitted by the type (e.g. integer) of a data structure being used to store the pseudo-random value, n may be chosen close to the maximum permitted by the type of the data structure used to store the pseudo-random value. For example, the prime number may be based on a bit-width of an architecture of the wireless communication device. For example, the prime number may be the largest (or second largest, third largest etc.) prime number that can be represented by the type of the data structure being used by the architecture of the wireless communication device. In other words, n may be a prime number that is lower than $2^{width\_bits}$, wherein width_bits is a bit-width of an architecture of the wireless communication device. Accordingly, m may be $2^{width\_bits}$. For example, if the wireless communication device uses a 16-bit architecture, or if the pseudo-random value is stored as a 16-bit (unsigned) integer, n may be 65521. If the wireless communication device uses a 32-bit architecture, or if the pseudo-random value is stored as a 32-bit (unsigned) integer, n may be 4294967291.

For example, the following calculation rule may be employed by the function:

$$S(\text{index},\text{seed},\text{width\_bits},\text{prime})=((\text{index}+\text{seed}) \bmod 2^{width\_bits})^k \bmod \text{prime}$$

The output value, i.e. the pseudo-random value, of the pseudo-random number generator may be set to the state S(index,seed,width_bits,prime). width_bits may be the number of bits required for a binary representation of prime, which may be statically defined between transmitter and receiver. prime may be a prime number, e.g. the largest prime number that is smaller than $2^{width\_bits}$. S may be the output value of the random number generator, i.e. the pseudo-random value, and may be limited to the range of [0, (prime−1)]. k may be a natural number greater than 0.

Accordingly, if width_bits is 16 (e.g. in a 16-bit architecture, or with the pseudo-random value being stored in a 16-bit unsigned integer), the pseudo-random value may be calculated using ((index+seed) mod 65536)$^2$ mod 65521. This formula may be used for the design of a pseudo-random based channel access on a 16-bit architecture (representable multiplication result=32 bit).

If width_bits is 32 (e.g. in a 32-bit architecture, or with the pseudo-random value being stored in a 32-bit unsigned integer), the pseudo-random value may be calculated using ((index+seed) mod 4294967296)$^2$ mod 4294967291. This formula may be used for the design of a pseudo-random based channel access on a 32-bit architecture (representable multiplication result=64 bit).

The method comprises selecting 130 the wireless resource based on the pseudo-random value. In general, the wireless resources may be selected from a plurality of wireless resources, e.g. a plurality of wireless resources that are suitable for the task at hand. For example, the plurality of wireless resources may be enumerated, and the pseudo-random value may be used to select one of the plurality of wireless resources based on the enumeration of the plurality of wireless resources. For example, the number of the plurality of wireless resources may be $N_{slots}$. The range of the pseudo-random value may be converted to the range of the plurality of wireless resources. In some embodiments, this may be done by choosing the prime number so low that it lies within the enumeration of the plurality of wireless resources. Alternatively, the output of the function, e.g. the pseudo-random value, may be scaled to the range of the enumeration. For design purposes, the scaling and shifting of the output value range of the pseudorandom number generator to the number of wireless resources (e.g. channels) available in the radio system may be performed using the following formula:

$$\hat{S} = \frac{SN_{slots}}{2^{width\_bits}}$$

wherein $\hat{S}$ is the scaled pseudo-random value, and S is the pseudo-random value. The above value may be rounded, e.g. by using one of the following formulae:

$$\hat{S} = \left\lceil \frac{SN_{slots}}{2^{width\_bits}} \right\rceil$$

or $$\hat{S} = \left\lfloor \frac{SN_{slots}}{2^{width\_bits}} \right\rfloor$$

The method comprises using 140 the wireless resource for a wireless communication with a further wireless communication device. For example, the selected wireless resource may be used 140 for listening (i.e. scanning) 142 for a wireless transmission of the further wireless communication device. For example, if the selected wireless resource is used for listening for a wireless transmission, the wireless communication device might not listen at other wireless resources of the plurality of wireless resources, i.e. the wireless communication device may forego listening for wireless transmissions at other wireless resources of the plurality of wireless resources. Alternatively (or additionally), the selected wireless resource may be used for transmitting 144 a wireless transmission to the further wireless communication device.

Compared to the Mersenne-Twister random number generator, the dynamic part of the state information index might only require width_bits for representation. This may facilitate an implementation of a channel access where state information for resynchronization is to be distributed simultaneously with the channel access of the transmitter. In particular, the index value may be used as a counter for channel access operations of the transmitting wireless communication device. Compared to the Mersenne Twister, the non-recursive calculation of the value S from the state information index may result in a lower computational effort when a state of the pseudo-random number generator is to be regenerator. If index is used as a packet counter, the complexity of resynchronizing the receiver is therefore independent of the number of packets sent by the sender in the state of a temporary connection termination.

Compared to a linear congruence generator, embodiments may result in a better statistical distribution of the initial values. In particular, the output values of the proposed random number generator may have better correlation properties with regards to two successive input values (index, index+1). A wireless communication system that uses such pseudo-random values may therefore be expected to reduce the number of successive packet collisions.

The transceiver module 12 may be implemented as a means for transceiving, i.e. receiving and/or transmitting etc., one or more transceiver units, one or more transceiver devices and it may comprise receiver and/or transmitter components, such as one or more elements of the group of one or more Low-Noise Amplifiers (LNAs), one or more Power Amplifiers (PAs), one or more filters or filter circuitry, one or more diplexers, one or more duplexers, one or more Analog-to-Digital converters (A/D), one or more Digital-to-Analog converters (D/A), one or more modulators or demodulators, one or more mixers, one or more antennas, etc. For example, the transceiver module may be configured to communicate via Ultra Wide Band communication.

In embodiments the processing module 14 may be implemented using one or more processing units, one or more processing devices, any means for processing, such as a processor, a computer or a programmable hardware component being operable with accordingly adapted software. In other words, the described function of the processing module 14 may as well be implemented in software, which is then executed on one or more programmable hardware components. Such hardware components may comprise a general purpose processor, a Digital Signal Processor (DSP), a micro-controller, etc.

Figure 2:
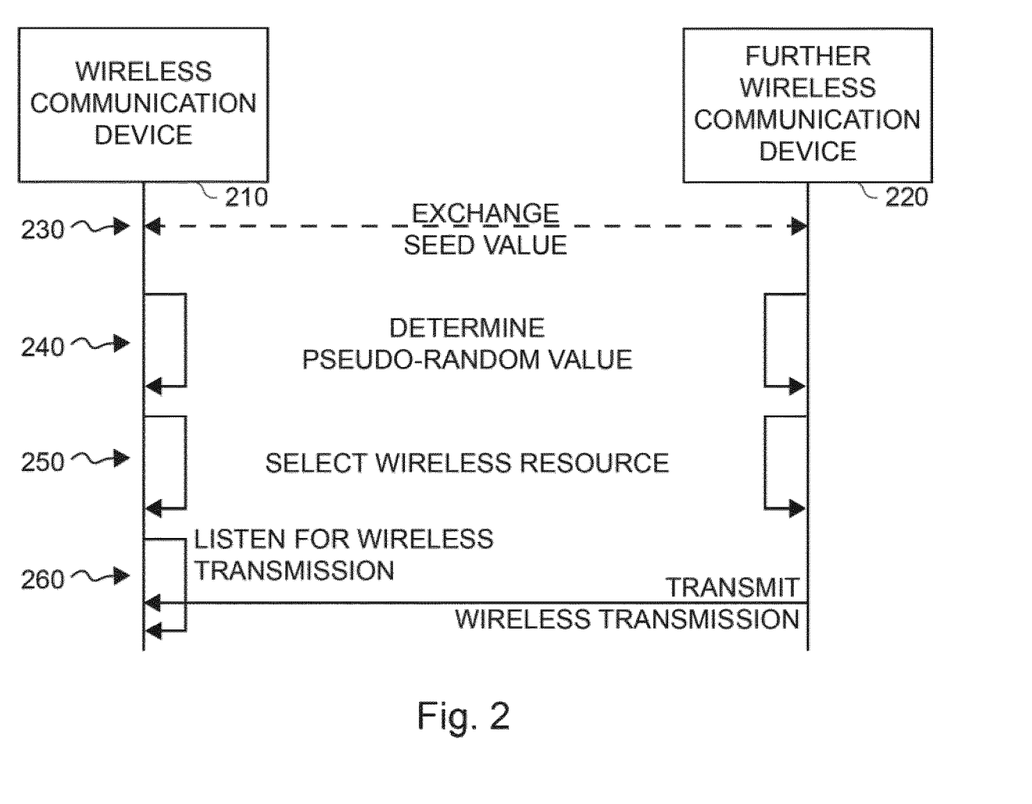
FIG. 2 shows a schematic diagram of a system comprising two wireless communication devices in accordance with the present subject matter.

FIG. 2 shows a schematic diagram of a system comprising two wireless communication devices. The system comprises a wireless communication device 210 and a further wireless communication device 220. Both wireless devices may be implemented similar to the wireless communication device 10 of FIGS. 1*a* to 1*c*. A processing module of the wireless communication device 210 is configured to use the selected wireless resource for listening for a wireless transmission of the further wireless communication device 220. A processing module of the further wireless communication device 220 is configured to use the selected wireless resource for transmitting a wireless transmission to the wireless communication device 210.

At reference sign 230, the wireless communication devices 210; 220 may optionally exchange the seed value, e.g. by transmitting information on the seed value from the wireless communication device 210 to the further wireless communication device 220, or by transmitting information on the seed value from the wireless communication device 220 to the further wireless communication device 210. Alternatively, the seed value may be known from a previous communication, or may be derived from a shared cryptographic secret.

Additionally, the index value may be synchronized between the two wireless communication devices, either by mutually starting at 0, by using a packet/wireless transmission counter, or by transmitting information on the index value from the wireless communication device 210 to the further wireless communication device 220 (or vice versa).

At reference sign 240, both wireless communication devices may determine the pseudo-random value, which may be the same at both wireless communication devices. At reference sign 250, both wireless communication devices may select a wireless resource, e.g. the same wireless resource. At reference sign 260, wireless communication device 210 may use the selected wireless resource to listen for a wireless resource from the further wireless communication device. The further wireless communication device 220 may transmit the wireless resource using the wireless resource that the wireless communication device 210 uses to listen for the wireless transmission.

The aspects and features mentioned and described together with one or more of the previously detailed examples and figures, may as well be combined with one or more of the other examples in order to replace a similar feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or electronic control units programmed to perform the acts of the above-described methods or (field) programmable logic arrays ((F)PLAs) or (field) programmable gate arrays ((F)PGAs), programmed to perform the acts of the above-described methods.

What is claimed is:

1. A method for a wireless communication device, the method comprising:
   determining a pseudo-random value using a non-recursive function having at least one non-linear component;
   selecting a wireless resource based on the pseudo-random value; and
   using the wireless resource for a wireless communication with another wireless communication device,
   wherein the pseudo-random value is determined using a seed value and an index value,
   wherein the seed value is known between the wireless communication device and the another wireless communication device,
   wherein the index value is changed for every wireless transmission between the wireless communication device and the another wireless communication device, and
   wherein the pseudo-random value is calculated using one of:

$$(\text{index}+\text{seed})^k \bmod n$$

or $$((\text{index}+\text{seed}) \bmod m)^k \bmod n$$

wherein index is the index value, seed is the seed value, and k, m and n are natural numbers.

2. The method according to claim 1, wherein
   a formula being used to determine the pseudo-random value is, apart from the seed value and the index value, based on constant values.

3. The method according to claim 1, wherein the method further comprises:
   receiving the seed value and/or the index value from the another wireless communication device, or
   the method further comprises:
   transmitting the seed value and/or the index value to the another wireless communication device.

4. The method according to claim 1, wherein
   the pseudo-random value is determined based on a non-linear transformation of a combination of the seed value and the index value.

5. The method according to claim 4, wherein
   the non-linear transformation comprises exponentiation.

6. The method according to claim 4, wherein
   an upper limit of the combination of the seed value and the index value is based on a bit-width of an architecture of the wireless communication device.

7. The method according to claim 1, wherein
   $m=2^{width\_bits}$ and n is a prime number that is lower than m, wherein width_bits is a bit-width of an architecture of the wireless communication device.

8. The method according to claim 1, wherein the pseudo-random value is calculated using:

$$((\text{index}+\text{seed}) \bmod 65536)^2 \bmod 65521$$

or $$((\text{index}+\text{seed}) \bmod 4294967296)^2 \bmod 4294967291.$$

9. The method according to claim 1, wherein
   the pseudo-random value is limited to a range of values using a modulo operation,
   the modulo operation is performed using a prime number, and
   the prime number is based on a bit-width of an architecture of the wireless communication device.

10. The method according to claim 1, wherein
    the wireless resource is one or a frequency resource, a time resource or a frequency-time resource, and
    the selected wireless resource is used for listening for a wireless transmission of the another wireless communication device, or
    the selected wireless resource is used for transmitting a wireless transmission to the another wireless communication device.

11. A non-transitory computer-readable medium comprising instructions operable, when executed by one or more computing systems, to perform the method of claim 1.

12. A wireless communication device, comprising:
    a transceiver to communicate with another wireless communication device; and
    a processor configured to:
    determine a pseudo-random value using a non-recursive function having at least one non-linear component;
    select a wireless resource based on the pseudo-random value; and
    use the wireless resource for a wireless communication with the another wireless communication device,
    wherein the pseudo-random value is determined using a seed value and an index value,
    wherein the seed value is known between the wireless communication device and the another wireless communication device, wherein the index value is changed for every wireless transmission between the wireless communication device and the another wireless communication device, and wherein the pseudo-random value is calculated using one of:

$(\text{index}+\text{seed})^k \bmod n$ or $((\text{index}+\text{seed}) \bmod m)^5 \bmod n$ wherein index is the index value, seed is the seed value, and k, m and n are natural numbers.

13. A system comprising:

a first wireless communication device according to claim 12, and a second wireless communication device according to claim 12, wherein the processor of the first wireless communication device is configured to use the selected wireless resource for listening for a wireless transmission of the second wireless communication device, and the processor of the second wireless communication device is configured to use the selected wireless resource for transmitting a wireless transmission to the first wireless communication device.

\* \* \* \* \*